United States Patent
Ketels et al.

(10) Patent No.: US 6,688,962 B1
(45) Date of Patent: Feb. 10, 2004

(54) METHOD AND APPARATUS FOR ALIGNING A DEAD FISH

(75) Inventors: Dieter Ketels, Kühsen (DE); Holger Kahre, Lübeck (DE)

(73) Assignee: Nordischer Maschinenbau Rud.Baader GmbH + Co KG, Lubeck (DE)

( * ) Notice: Subject to any disclaimer, the term of this patent is extended or adjusted under 35 U.S.C. 154(b) by 0 days.

(21) Appl. No.: 10/030,628

(22) PCT Filed: Jul. 14, 2000

(86) PCT No.: PCT/EP00/06787

§ 371 (c)(1), (2), (4) Date: May 7, 2002

(87) PCT Pub. No.: WO01/03510

PCT Pub. Date: Jan. 18, 2001

(30) Foreign Application Priority Data

Jul. 14, 1999 (DE) ......... 199 32 824

(51) Int. Cl.⁷ ......... A22C 21/00; A22C 5/00; A22C 25/16
(52) U.S. Cl. ......... 452/163
(58) Field of Search ......... 452/163, 149, 452/160

(56) References Cited

U.S. PATENT DOCUMENTS

| | | | | |
|---|---|---|---|---|
| 2,563,008 A | * | 8/1951 | Danielsson | 452/180 |
| 2,895,163 A | * | 7/1959 | Danielsson | 452/180 |
| 3,123,853 A | * | 3/1964 | Rdloff et al. | 452/167 |
| 4,215,452 A | * | 8/1980 | Nagrotzki | 452/108 |
| 4,321,729 A | * | 3/1982 | Ollik | 452/170 |
| 5,626,513 A | | 5/1997 | Curtis | |
| 5,702,295 A | * | 12/1997 | Ketels | 452/180 |

FOREIGN PATENT DOCUMENTS

| | | |
|---|---|---|
| DE | 219376 | 3/1985 |
| GB | 1309359 | 3/1973 |
| WO | WO99/13731 | 3/1999 |

* cited by examiner

*Primary Examiner*—Charles T. Jordan
*Assistant Examiner*—Judith A. Nelson
(74) *Attorney, Agent, or Firm*—Mattingly, Stanger & Malur, P.C.

(57) ABSTRACT

In order to sever heads of fish or, in the case of pre-decapitated fish collar bones remaining on the torso from the torso at a preset location (38) with a blade (11) whose cutting edge runs transversely to the orientation of the fish, the fish must be aligned relative to the blade's cutting plane (39). Since in known methods and apparatus and particularly regarding differing fish size difficulties occur in precisely engaging the fish for the purpose of displacing them as well as due to their deformation in obtaining the correct positioning, it is proposed that the fish be gripped in form-locking relationship at a dimensionally stable location such as the head by a movable positioning device (4) and displaced in a direction towards the cutting plane (39) until the preset location (38) lies in the cutting plane. To this end a positioning device (4) is provided which can be brought into form-locking engagement with a dimensionally stable location of the fish and which has a slide mechanism that aligns the fish. Thus alignment can be achieved automatically avoiding inaccuracies by an operator, on the one hand, and without any unwanted shifting of the cutting point which often occurs following elastic deformations of the fish body, on the other.

36 Claims, 7 Drawing Sheets

METHOD AND APPARATUS FOR ALIGNING A DEAD FISH

Figure 1:
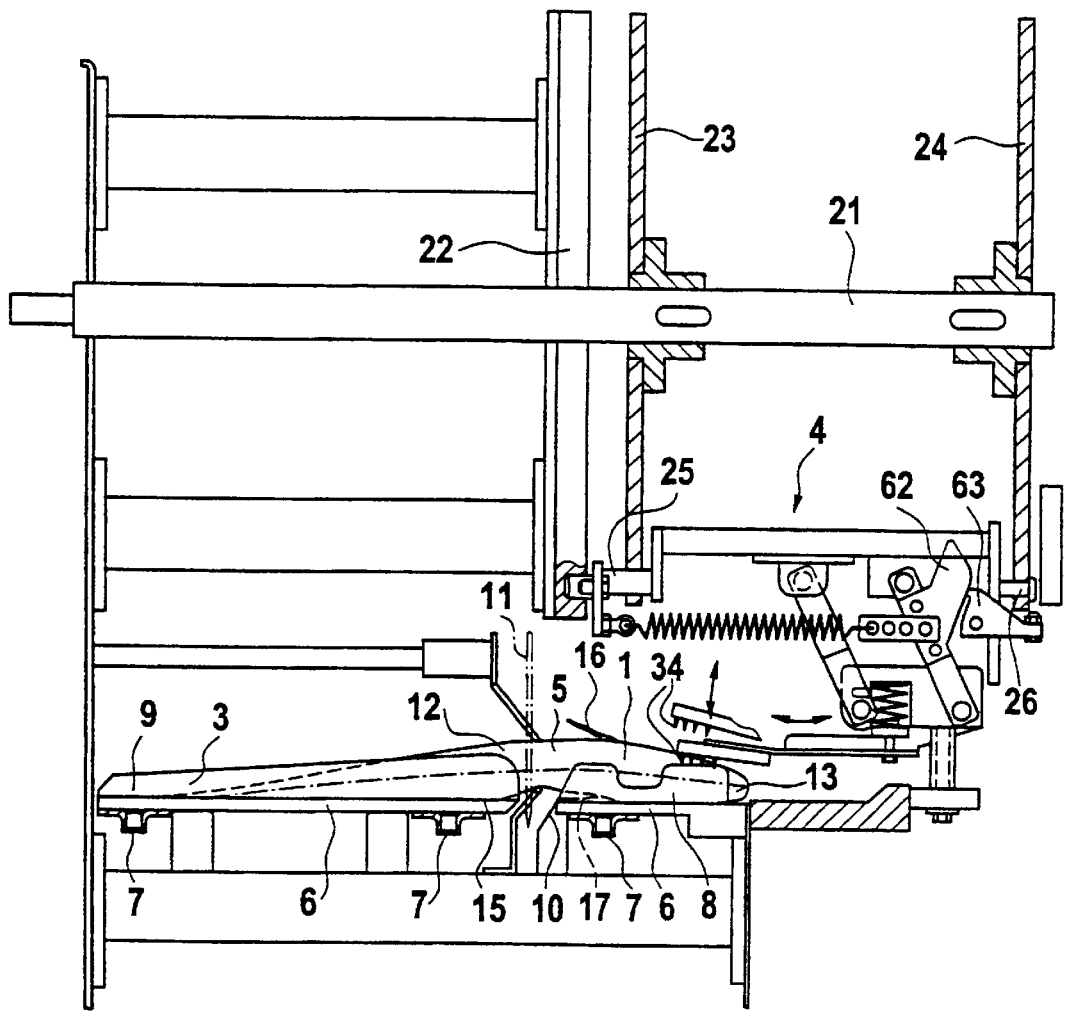

The invention concerns a method for aligning a dead fish, a head-side section of which is to be separated from its torso at a preset location with a blade of which the cutting edge runs transversely to the orientation of the fish in a cutting plane relative to which the fish is aligned.

Furthermore the invention consists in an apparatus for aligning a dead fish of which a head-side section is to be separated from its torso at a preset location with a blade of which the cutting edge is arranged transversely to the orientation of the fish in a cutting plane relative to which the fish can be arranged to make a blade cut In the following, the term "head" is to be understood to mean a head-side portion of a fish also possibly including the gills, side fins and/or collar bones. Therefore, fish of which the head as such has already been cut off with such elements left on the torso also have to be considered to fall within the scope of the invention.

Machines for separating a head from a torso of a fish are known. The blade for separating the head is to be guided at a location of the fish at which as much fish flesh as possible remains on the torso, and the head is separated along a rear boundary of its bone facing towards the torso. Here it turned out that side fins mark with sufficient reliability this location which is particularly suitable for separating the head. For this reason the dead fish is aligned with respect to these side fins in a trough which transports the fish and which is divided into head and body supports. A cut is made with a blade along this division, this being either immediately in front of the side fins in a direction towards the head or immediately behind the side fins in a direction towards the torso.

Here it should be taken into account that the dead fish lies in the trough used to convey it with a clearance which allows a movement of the fish in its longitudinal direction. This clearance is smaller for large fish than for small fish. The clearance is limited by means of the side fins which serve as a measure for a cut which separates the head from the torso. These side fins catch when the fish is displaced within the trough in a catching device which is provided for this purpose and in relation to which a cutting plane in which the blade used to separate the head is moved, is positioned.

With known devices for aligning the fish, displacement of the fish within the trough was a problem. This was caused by the fact that the dead fish could not be gripped with the necessary reliability within the trough, so that misalignment were common. In that case for example the fish for the purpose of displacement within the trough was acted upon in the region of its mouth by a slide plate which was intended to displace the fish rearwards in its longitudinal direction in a direction facing away from the head. Depending on the resistance with which the fish met within a trough, the head was deformed without displacement of the fish taking place. The fish therefore could not be moved into a position in which optimum separation of the head from the torso was possible.

Furthermore it has also been attempted to grip the fish in form-locking relationship in the region of its torso in order to align it within the trough. In this case difficulties arose in so far as the torso essentially consists of fish flesh which was deformed elastically when forces were applied by means of a form-locking coupling device, so that in this respect too there was no alignment of the fish, only a random combination of individual influencing variables.

Finally a method for coupling a dead fish to a displacement tool in which the head was coupled to the displacement tool has also already been practiced. The latter had a spike on which the fish head was impaled. The spike extended through the eye sockets of the fish head. This method requires considerable attention and concentration capacity of an operator performing impalement of the head. The operator however over a manageable period of his work with a fish succession of 30 to 40 fishes per minute could not ensure with the necessary reliability that the spike passed through the eye sockets, so that the head was not coupled to a displacement tool with the necessary reliability. Dependence of coupling on the attention of an operator therefore proved to be inadequate.

It is therefore the object of the present invention to couple the fish to an alignment tool so reliably that the head is separated from the torso at a preset location.

This object is now achieved with respect to the method by the fact that the fish is gripped in form-locking relationship at a dimensionally stable location by a movable positioning device and displaced in a direction towards the cutting plane until the preset location lies in the cutting plane.

By coupling the positioning device to a dimensionally stable location of the fish body it is ensured that no inaccuracies in positioning of the fish occur due to elastic deformations of the fish body.

With respect to the apparatus the set object is achieved by the fact that a positioning device which can be brought into form-locking engagement with a dimensionally stable location of the fish and which is provided with a slide mechanism that aligns the fish, is provided.

Due to this positioning device, coupling of the fish becomes independent of the attention of an operator. Coupling to the dimensionally stable location ensures that elastic deformations of the fish body do not lead to unwanted shifting of a cutting point.

According to a preferred embodiment of the invention the preset location is oriented by side fins of the fish. These mark with sufficient reliability the transition from the head to the torso so that, depending on requirements, the head is separated on a side of the side fins facing towards it or on a side of the side fins facing away from it According to a further preferred embodiment of the invention the positioning device is caught in form-locking relationship in the region of the head. As the head is the only dimensionally stable location of a fish body, it is especially suitable for transmitting the forces applied to the fish body in its region, to the whole of the fish body.

According to a further preferred embodiment of the invention the positioning device penetrates with at least one pointed object into a flesh cover of a skull bone which is present in the course of the lateral boundary surface and in which it is clamped in form-locking relationship. This flesh cover is so thick that the positioning device can be clamped in it. On the other hand the thickness of this flesh cover does not allow deformation with respect to a skull bone covering it. Forces which are applied to the flesh cover are imparted directly to the skull bone and hence to the whole of the fish body.

According to a further preferred embodiment of the invention the positioning unit is guided on an arcuate path which runs roughly in a vertical plane in the lower position of which the pointed object penetrates into the flesh cover of the head. In this way reliable guiding of the positioning device is possible. The latter grips the head at a respectively desired location and holds it fast for a time necessary to make the separating cut. Guiding of the positioning device in a vertical plane can also be achieved structurally very favorably.

According to a further preferred embodiment of the invention the positioning device is conveyed on the path at a speed which corresponds to a speed of conveying the fish. Due to coordination of the two speeds, the fish is guided reliably by the positioning device while it is conveyed and is not released from this guide.

According to a further preferred embodiment of the invention the positioning device is conveyed in the bottom position of the path in the same direction as the fish lying in the trough. In this way the positioning device during conveying does not run in a different direction to the fish lying in the trough. Damage to the fish by different directions of the positioning device on the one hand and of the fish lying in the trough on the other hand is avoided.

According to a further preferred embodiment of the invention the fish gripped by the positioning device is displaced by means of a spring force in the trough until the preset location extends in the cutting plane. This drive for displacement of the fish is simple and hence not susceptible to breakdowns. No operational breakdown during displacement of the fish is to be feared.

According to a further preferred embodiment of the invention the positioning device is provided with at least one pointed object which can be introduced into the fish and which in the region of the head is provided with a mechanism which brings it into form-locking engagement with the fish. This pointed object catches with high reliability in the region of the head with the aid of the mechanism which therefore makes coupling of the fish independent of an operator of the apparatus. In this case according to a further preferred embodiment of the invention the pointed object is provided with two guides, of which a first one extends in the direction of advance maintained by the fish transversely to the longitudinal direction of the fish, and a second one extends transversely thereto in the direction of a longitudinal axis of the fish lying in a conveying device. These two guides allow highly reliable coupling of the fish to the positioning device, so that a decapitating cut can be made at a preset location of the fish body.

According to a further preferred embodiment of the invention the first guide is constructed as an arc which in the region of the head reaches a bottom position adjacent to the head, in which it extends in form-locking relationship into the flesh cover of the head. This guiding along an arc allows reliable catching of the pointed object on the head of the fish. Here, according to a further preferred embodiment of the invention, the guide for the pointed object is in the form of a carousel. The latter according to a further preferred embodiment of the invention consists of a circle curve on which a first suspension of the pointed object is guided, and of a second suspension of the pointed object which is guided relative to the first suspension in such a way that the pointed object is guided over a given distance in its position holding the head. In this way it is possible to carry out the required guiding of the head until the separating cut is made.

According to a further preferred embodiment of the invention, on the circle curve is superimposed an oval channel curve in which the second suspension of the pointed object is guided in such a way that the pointed object in the region of a function zone is oriented vertically and perpendicularly to a trough. The combination of the circle curve with the oval channel curve results, precisely in the region of the necessary function zone, to narrow and precise guiding of the pointed object and hence reliable support of the fish until the head is separated.

According to a further preferred embodiment of the invention the function zone includes lowering of the pointed object in a direction towards the fish lying in the trough, displacement of the fish within the trough until the side fins are caught in a catching device, and lifting of the pointed object out of its form-locking engagement with the fish. These three sections of the function zone determine whether the fish is properly guided during separation of the head and is lying in the correct position in which the head is separated.

According to a further preferred embodiment of the invention the catching device consists of mouldings which on both sides of lateral boundary surfaces are oriented in a direction towards the fish lying in the trough in such a way that the side fins of the fish during displacement thereof are caught in them, so that the fish lies with a preset location in the region of the cutting plane of a decapitating blade. This catching device is also tried and tested with the positioning device according to the invention and leads to optimum performance of the separating cut.

According to a further preferred embodiment of the invention the catching device is divided into at least two sections which are arranged successively in the direction of conveying a trough for catching the fish which after conveying of the fish by a trough width has not yet reached its desired position for separation of the head. Due to this division of the catching device into two or more sections, alignment of the fish in its longitudinal direction is independent in time of the advance of the fish transversely to its longitudinal direction. Instead the alignment can be performed in the longitudinal direction of the fish at a moderate speed of alignment, so that the catching device is thus prevented from not catching the side fins with the necessary reliability. At too high a speed of this longitudinal displacement, it must be expected that the catching device will not grip the side fins with the necessary reliability.

According to a further preferred embodiment of the invention the slide mechanism consists of a spring which moves the pointed object in the direction of the longitudinal axis of the fish in a direction towards the cutting plane. Such spring-dependent operation of the slide mechanism is on the one hand comparatively simple and cheap to execute, but on the other hand operationally very reliable. As a result, very reliable positioning of the fish is achieved with minimum structural expenditure.

According to a further preferred embodiment of the invention the pointed object is biased by a pressure spring which forces it in a direction towards the fish. This pressure spring can be adjusted to the strength conditions on the one hand of the head and on the other hand of the flesh cover, so that on coupling the head there is no need to fear that perhaps the head will be destroyed or coupling will not be effected satisfactorily.

According to a preferred embodiment of the invention a pivot arm which moves the fish is mounted pivotably in a plane in which the fish extends with its longitudinal axis in the trough. This longitudinal axis of the fish is appropriately oriented obliquely to a plane in which the pointed object is brought into form-locking engagement with the head. This oblique orientation has the advantage that the separating cut is made in a plane which runs not at right angles to the longitudinal axis of the fish, but obliquely in order to produce as high as possible a yield of fish flesh which remains joined to the torso of the fish, without considerable quantities of fish flesh remaining on the head on separation of the head.

According to a further preferred embodiment of the invention a stronger spring is provided for large fish and a smaller spring for the displacement of smaller fish. In this way each fish is displaceable within the trough with the force appropriate to it.

According to a further preferred embodiment of the invention the slide mechanism can be locked by a ratchet system in its end position holding the fish in its cutting position. This ratchet system leads to cutting taking place in a fixed position of the fish.

According to a further preferred embodiment of the invention the fish during separation of the head from the torso is biased via the pointed object by the spring. The spring bias which exists for the duration of separation leads to the fact that the fish can be divided at the preset location with the necessary reliability on account of its fixed guiding in the trough.

Further details of the invention are apparent from the detailed description below and the attached drawings in which a preferred embodiment of the invention is illustrated by way of example.

Figure 2:
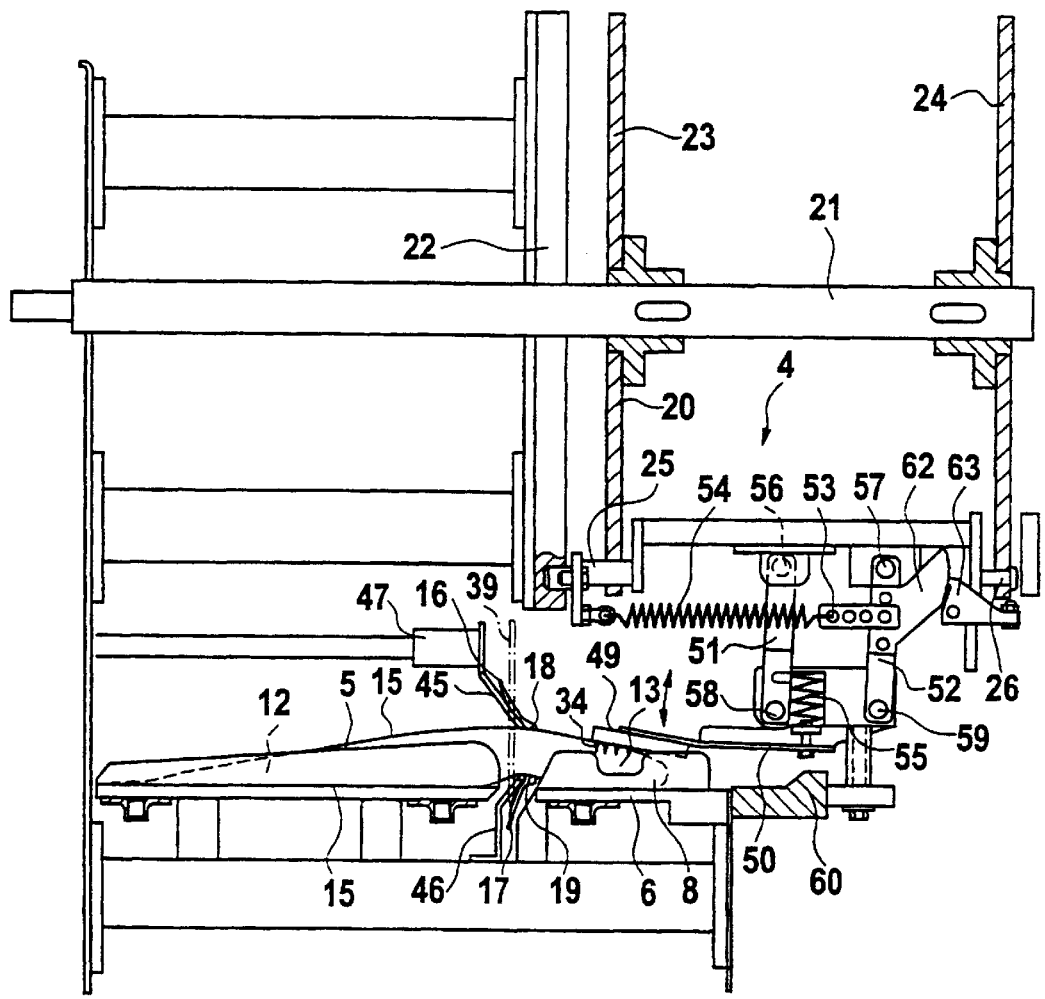
Figure 3:
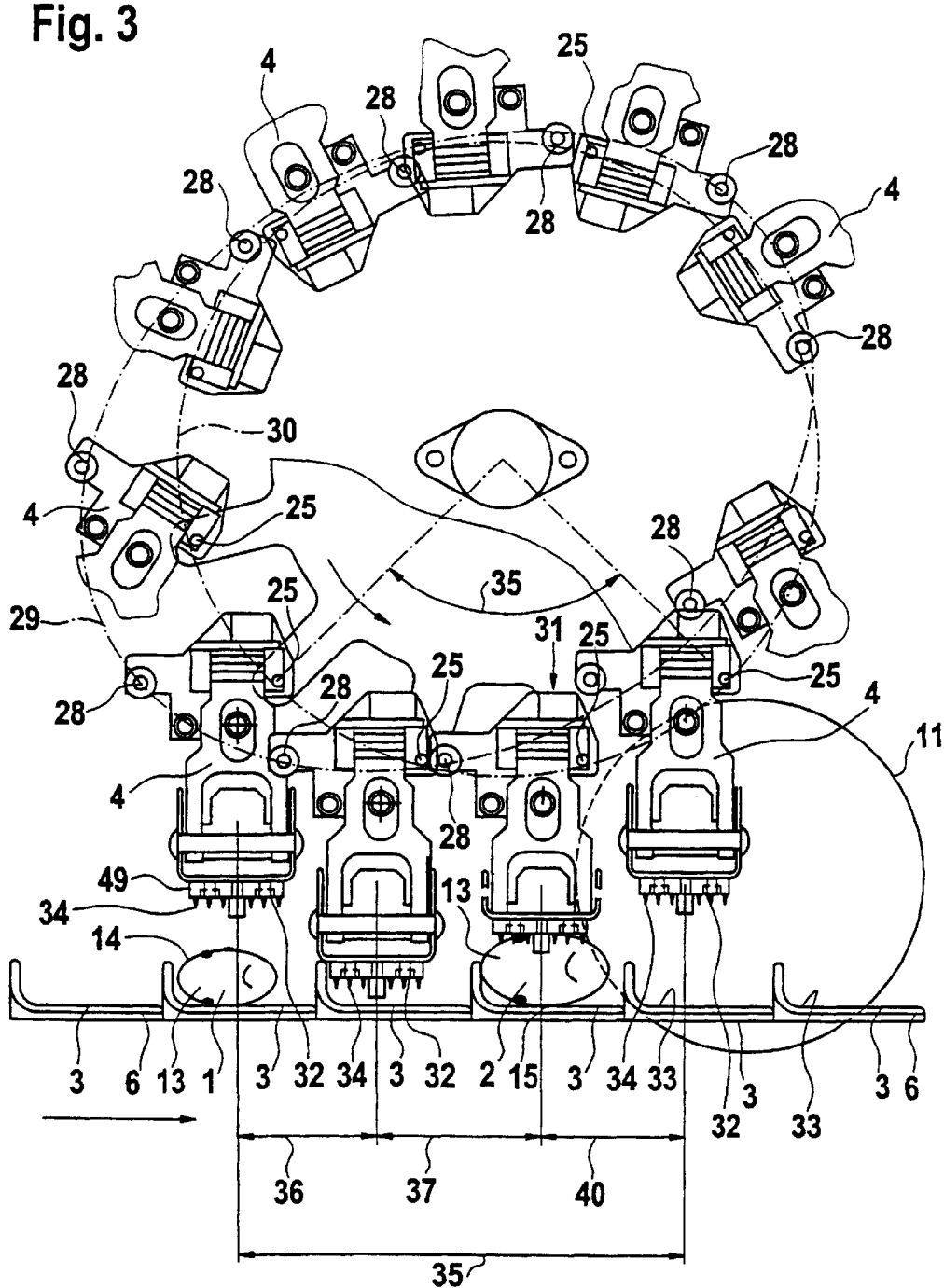
Figure 4:
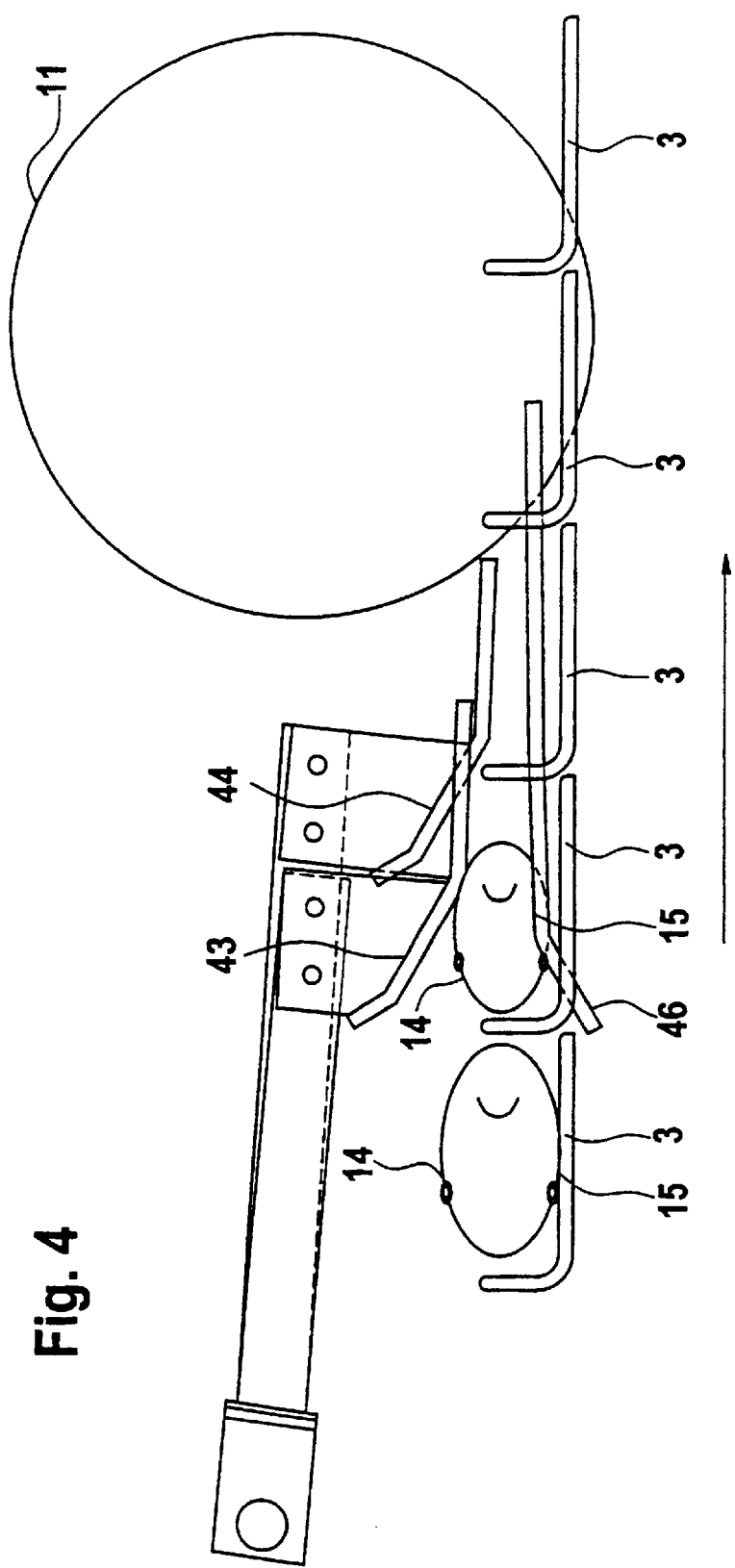
Figure 5:
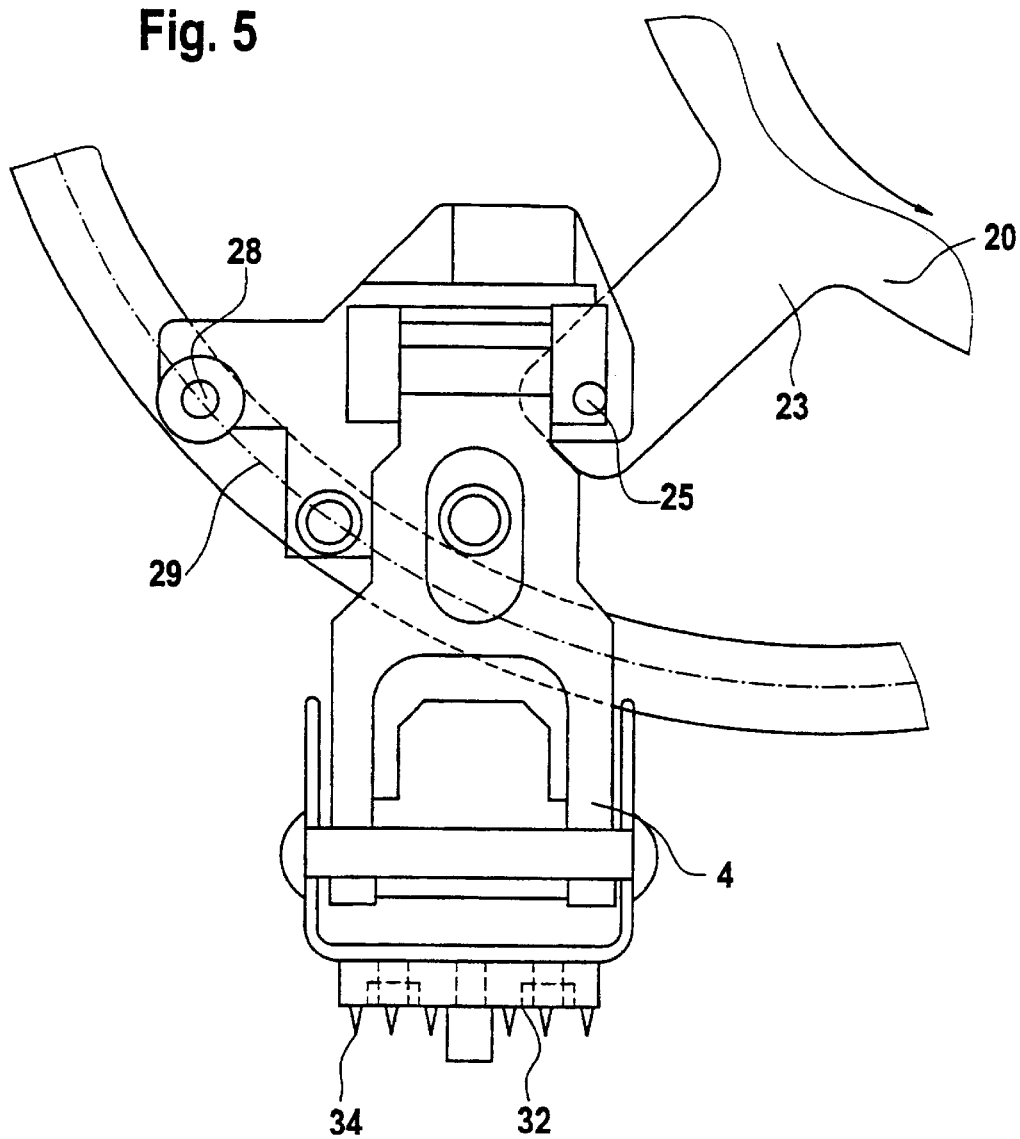
Figure 6:
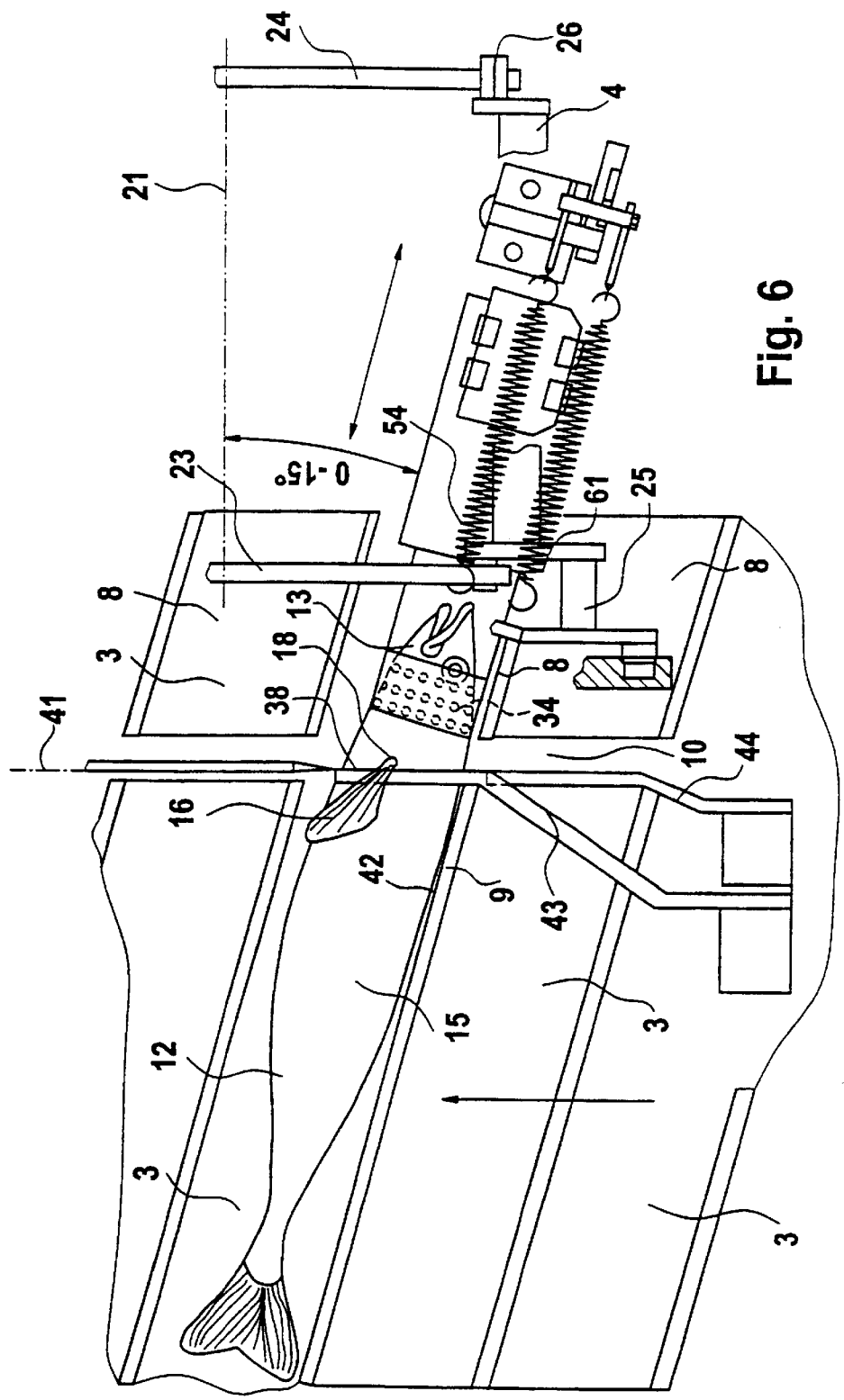
Figure 7:
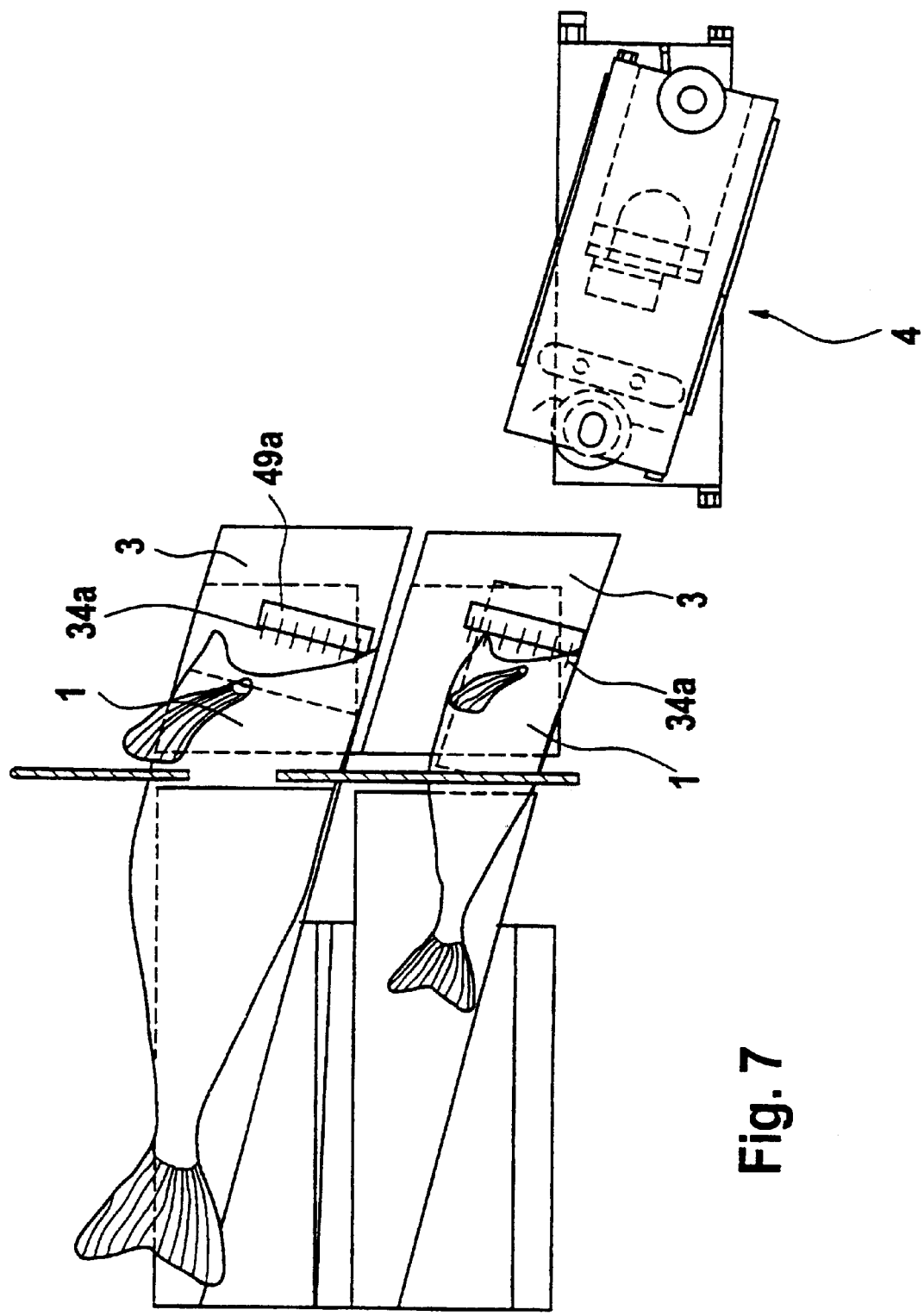

The drawings show:

FIG. 1 partly sectional side view of the positioning device at the beginning of the sliding process, FIG. 2 partly sectional side view of the positioning device at the end of the sliding process, FIG. 3 front view of a tool carrier, FIG. 4 schematic side view of a catching device, FIG. 5 front view of a rocker mounted in a guide, FIG. 6 top view of a positioning device, and FIG. 7 top view of a positioning device for a fish which has been pre-decapitated but with the side fins and collar bones left on the torso.

A machine for positioning fish 1, 2 essentially consists of troughs 3 and a positioning device 4. The fish 1, 2 lie in the troughs 3 in which they are conveyed transversely to their longitudinal extent 5 by means of chains 6 to which the troughs 3 are connected by bolts 7. The troughs 3 are divided into a head support 8 and a body support 9. Between the head support 8 and the body support 9 extends a slot 10 in the region of which is arranged a blade 11. This blade 11 is constructed as a circular blade which is mounted in rotating relationship in the region of the slot 10. It is however also conceivable to arrange other blades 11, for example translationally operating blades, in the region of the slot 10. Furthermore, instead of one blade 11 a pair of blades can be provided in the region of the slot 10 if, depending on the kind of fish 1, 2 to be decapitated, a so-called wedge cut is to be made.

The fish 1, 2 lies with its torso 12 on the body support 9 and with its head 13 on the head support 8. The head 13 is the most dimensionally stable part of the fish 1, 2, which is firmly surrounded with a thin flesh cover 14. The fish 1, 2 lies in the respective trough 3 on one of its lateral boundary surfaces 15. From these lateral boundary surfaces 15 protrude, in the side position of the fish 1, 2, side fins 16, 17 which are embedded by their respective roots 18, 19 in the lateral boundary surfaces 15.

Above the troughs 3 the positioning devices 4 are arranged in a carousel 20 which rotates about a shaft 21. This shaft 21 is mounted rotatably in a stand 22. The carousel 20 has two side plates 23, 24 which run with planes parallel to each other and which are rigidly connected to the shaft 21.

The positioning devices 4 are mounted rotatably on shaft ends 25, 26 in the two side plates 23, 24. Furthermore the positioning devices 4 are mounted in a channel curve 27 on rolling bodies 28 or on slide pieces which roll in the channel curve 27. The channel curve 27 extends in an oval 29. Here the oval 29 is arranged relative to a circle curve 30 described by the carousel 20 such that the oval 29 and the circle curve 30 overlap each other such that together in a bottom position 31 facing towards the troughs 3 they convey the positioning devices 4 in a path running roughly parallel to the troughs 3. In this way, in the bottom position 31 the positioning devices 4 which are guided on the carousel 20 and the channel curve 27 run with their lower boundaries 32 roughly parallel to a trough inner surface 33 acted upon by the fish 1, 2.

From the lower boundaries 32 of the positioning devices protrude pointed objects 34, for example nails. The latter become buried in the flesh cover 14 of the head 13 in the bottom position 31, and so guide the head 13 and hence the whole fish 1, 2 of which the head 13 is the most dimensionally stable part The carousel 20 and hence also the rolling bodies 28 passing through the channel curve 27 are connected mechanically, for example by a chain, to the chains 6 of an advance mechanism with which the troughs 3 are conveyed. In this way the carousel 20 has a speed which leads to the path speeds of the positioning devices 4 in the bottom position 31 corresponding to the advance speed at which the troughs 3 are conveyed. In this way the heads 13 of the fish 1, 2 lying in the troughs 3 remain during a whole function length 35 in form-locking engagement with the pointed objects 34 of the positioning devices 4. This function length 35 is composed of a lowering section 36 in which the positioning device 4 is lowered so far onto the head 13 of the fish 1, 2 that the pointed objects 34 become engaged in form-locking relationship with the head. The lowering section 36 is followed by a sliding section 37 in which the fish 1, 2 is displaced along its longitudinal extent 5 in the trough 3 until it lies with a preset location 38 in the region of a cutting plane 39 in which the blade 11 rotates.

The sliding section 37 is followed by the last section 40 of lifting out the function length 35. In this lifting section 40 the positioning device 4 is lifted out of form-locking engagement with the head 13 and conveyed away by the carousel 20 until in the region of the lowering section 36 it is again lowered in a direction towards a head 13 lying in the trough 3.

On this movement of the fish 1, 2 transversely to its longitudinal extent 5 is superimposed a movement of the fish 1, 2 in the direction of the longitudinal extent 5. This movement of the fish takes place in the direction of the troughs 3, which runs at right angles or obliquely relative to a blade plane spanned by the blade 11. A tilted position of the troughs 3 allows for the fact that the head 13 is separated from the torso 12 appropriately obliquely to the longitudinal extent 5 of the fish 1, 2. This alignment of the fish 1, 2 relative to the blade plane 41 leads to the head 13 being separated from the torso 12 along a blade plane 41 in which essential parts of the fish flesh which are located in the upper part 42 of a fish 1, 2 remain on the torso 12, so that the blade plane 41 extends directly in the region of one end of the head 3 facing towards the torso 12.

In this region are also located the roots 18, 19 of the side fins 16, 17, so that the latter are also a measure for separation of the head 13 from the torso 12. For this purpose transversely to the direction of the troughs 3 are provided catching devices 43, 44 which have an upper portion 45 and a lower portion 46. The upper portion 45 faces in a direction towards the positioning device 4 and is associated with an upper portion of the fish 1, 2 protruding from the trough 3. By contrast the lower portion 46 is provided in the region of the slot 10 between the head support 8 and the body support 9 and serves to catch the side fin protruding from this slot 10. The upper portion 45 of the catching device 43, 44 is mounted on a linkage 47 which is vertically yielding. The latter can be mounted in plain bearings, not shown.

The pointed objects 34 are attached to a plate 49 which is attached by a spring arm 50 to two parallel pivot levers 51, 52. These two pivot levers 51, 52 are mounted pivotably on the positioning device 4. Its pivot plane extends in the longitudinal extent 5 of the fish 1, 2.

The two pivot levers 51, 52 are connected by a coupling device 53 to a spring element 54 which is permanently mounted in the stand 22. The spring element 54 pulls the two pivot levers 51, 52 and the plate 49 provided with the pointed objects 34 in a direction towards the head 13 of the fish 1, 2 which is lying in a trough 3. Furthermore the spring arm 50 is acted upon by a compression spring 55 which biases the spring arm 50 downwards in a direction towards the head 13. This compression spring 55 is attached to one of the levers 51, 52. The spring element 54 pivots the two levers 51, 52 about the pivot points 56, 57, so that the ends 58, 59 of the pivot levers 51, 52 facing away from the pivot points 56, 57 are pivoted in a direction towards the fish 1, 2. In the process the plate 49 is biased in a direction towards the head 13, so that form locking is produced between the pointed objects 34 and the head 13. This is sufficient to apply the forces transmitted by the spring arm 50 to the head 13 of the fish and displace the latter together with the torso 12 within the trough 3. In the process the side fins 16, 17 are caught by the catching device 43, 44 until the movement of the fish 1, 2 comes to rest not later than in the region of the roots 18, 19. In this position the blade 11 makes the separating cut by which the head 13 is separated from the torso 12.

The pivot levers 51, 52 are pivoted as a function of a curve 60. The latter releases the levers 51, 52 for pivoting after the plate 49 with its pointed objects 34 has engaged in form-locking relationship in the head 13 of the fish 1, 2.

For reasons of safety, apart from the spring element 54 there is provided another spring element 61 which runs parallel to the spring element 54. This spring element 61 maintains operation of the whole apparatus in the event that one of the two spring elements 54, 61 breaks after exhaustion of its life. The two spring elements 54, 61 can have different spring forces for the transport of small or large fish, but each of the two can also have the same spring force.

A fish 1, 2 is laid in a trough 3 and conveyed transversely to its longitudinal extent 5 in a direction towards the positioning device 4. In the process it passes into the region of the function length 35, at the beginning of which in the lowering section 36 the pointed objects 34 of the plate 49 become buried in form-locking relationship in the head 13 of the fish lying on its lateral boundary surface 15. Now the positioning device 4 is conveyed at the same speed as the fish 1, 2 in its trough, so that form locking is maintained between the pointed objects 34 and the head 13. In the process the fish 1, 2 which is held fast by the positioning device 4 moves into the sliding section 37 and is there, owing to the force of the spring elements 54, 61, displaced within the trough 3 until the movement of the fish 1, 2 comes to rest in the region of the side fins 16, 17. In this case the sliding region 37 can extend across several widths of the trough 3, as the catching device 43, 44 has several sections 43, 44 which are oriented relative to each other such that the side fins 16, 17 are guided on the sections 43, 44 of the catching device. In this way the fish 1, 2 can be displaced at a reduced speed which however does not impair the working speed of the whole apparatus.

After the fish 1, 2 in the region of the side fins 16, 17 is positioned in the trough 3, the fish 1, 2 lying on the trough 3 is cut by the rotating blade 11. This cut runs at an angle of for example 0–15° to the direction of the drive shaft 21 of the positioning device. In this way optimum cutting of the fish 1, 2 is obtained. Here it is possible to lock the sliding system consisting of the two pivot levers 51, 52 with a ratchet system 62, in order not to let the forces of the springs 54, 61 act on the fish 1, 2 during the following head cut This ratchet system 62 is unlocked before the sliding section 37 by a curve 63 fixed to the stand. Due to the shape of this curve 63 the whole system can be locked again.

Here however it turned out that it is advantageous to maintain the pressure of the spring 54, 61 during the cutting process, in order to cause effective cutting. As soon as the blade 11 has approximately half penetrated into the fish 1, 2, the head 13 has an increased freedom of movement The forces maintained by the springs 54, 61 and transmitted by the plate 49 lead to a slight rotation of the head 13 so that the blade 13 cuts further into the nape region of the fish 1, 2.

During cutting, form locking between the fish 1, 2 and the positioning device 4 is maintained. This prevents the fish 1, 2 from changing position while the cut is made due to the friction of the blade 11, for example moving fast forward uncontrolled. For this reason it is only after the cut is made that the plate 49 with the pointed objects 34 is raised, so that the positioning device 4 releases the head 13 which has meanwhile been separated.

FIG. 7 shows, in principle, the possibility of processing fish, as well, whose head has been removed in part due to standards required following regulations and habits in various regions of the world. In such fish, the collar bone and side fins are still present on the torso and are to be cut off to prepare the torso for further processing such as filleting. To this end, and as can be taken from this figure, the plate 49 of the above-mentioned embodiment has been replaced by plate 49a which is arranged to be essentially perpendicular to the bottom of troughs 3, with its pointed objects 34a facing towards the torso, i.e. the pre-cutting face. The plate 49a is attached to the positioning device 4 which moves the pre-headed fish, as described before, but with the pointed objects 34a preventing the backbone/vertebral column from sliding on the plate and thus losing its aligned and correct position.

What is claimed is:

1. Method for processing fish by aligning a dead fish (1, 2) whose head (13) is to be separated from its torso at a predetermined place (38) of the fish with a blade, a cutting edge of which runs traversely to an orientation of the fish in a cutting plane (39) relative to which the fish (1, 2) is aligned, the fish (1, 2) being engaged in form-locking relationship at a dimensionally stable part of the fish by a movable positioning device (4), displaced in a direction towards the cutting plane (39) until the predetermined place (38) concurs with the cutting plane (39), and decapitated in such position, characterised in that the positioning device (4) holds the fish (1, 2) fast in said form-locking and additionally frictional relationship along a functional distance (35) during which a) the positioning device (4) is lowered onto the fish (1, 2), b) the fish (1, 2) with its predetermined place (38) is displaced in a direction towards the cutting plane (39), and c) a cut is made for separating the head (13) and the positioning device (4) is lifted off the fish (1, 2) again, the displacement position of the fish being maintained throughout the cutting procedure.

2. Method according to claim 1, characterised in that the predetermined place (38) is oriented by side fins (16, 17) of the fish (1, 2).

3. Method according to claim 2, characterised in that the predetermined place (38) lies on one side of a fin root (18) facing away from the head (13), by which fin root (18) the side fin (16, 17) is anchored in the torso (12) of the fish (1, 2).

4. Method according to claim 2, characterised in that the predetermined place (38) lies on one side of a fin root (18) facing towards the head (13), by which fin root (18) the side fin (16, 17) is anchored in the torso (12) of the fish (1, 2).

5. Method according to claim 1, characterised in that the fish (1, 2) is displaced on lateral surfaces (15) of its body along a path until side fins (16, 17) protruding from the lateral surfaces (15) are caught in a catching device (43, 44).

6. Method according to claim 1, characterised in that the positioning device (4) is caught in form-locking relationship in the region of the head (13).

7. Method according to claim 6, characterised in that the positioning device (4) penetrates with at least one pointed object (34) into a flesh layer (14) covering the head (13) which layer exists in the extension of a lateral fish surface (15) and in which the positioning device (4) is caught in form-locking relationship.

8. Method according to claim 7, characterised in that the positioning device (4) is conveyed along an arcuate path which runs-roughly in a vertical plane in a bottom position (31) of which the pointed object (34) penetrates into the flesh layer (14) covering the head (13).

9. Method according to claim 8, characterised in that the positioning device (4) is conveyed along the path at a speed which corresponds to conveying speed of the fish (1, 2).

10. Method according to claim 9, characterised in that the fish (1, 2) is conveyed in a trough (3) which is roughly adapted to it and whose conveying speed corresponds to the speed of the positioning device (4).

11. Method according to claim 10, characterised in that in the bottom position (31) of the path the positioning device (4) is conveyed in the same direction as the fish (1, 2) lying in the trough.

12. Method according to claim 10, characterised in that the fish (1, 2) gripped by the positioning device (4) is displaced by means of spring force in the trough (3) until the predetermined place (38) concurs with the cutting plane (39).

13. Method according to claim 1, characterised in that the positioning device (4) runs along a path preset by a carousel (20).

14. Method according to claim 1, characterised in that the positioning device (4) is guided in a channel curve (27) having the shape of an oval (29).

15. Apparatus for processing fish by aligning a dead fish (1, 2) whose head (13) is to be separated from its torso at a predetermined place (38) of the fish with a blade (11), a cutting edge of which extends transversely to an orientation of the fish in a cutting plane relative to which the fish is aligned for performing a blade cut, the apparatus comprising a positioning device (4) adapted for engaging the fish (1, 2) by form-locking engagement at a dimensionally stable part of the fish (1, 2) and for aligning the fish (1, 2) by displacement in a direction towards the cutting plane (39) characterised in that the positioning device (4) comprises engagement means (34) adapted for said form-locking and additionally for fictional engagement along a functional distance (35) of the apparatus, and motion means including at least one spring element (54, 61) for moving the engagement means (34) in the direction of a longitudinal extent (5) of the fish (1, 2), said engagement means (34) being biased by a compression spring (55) towards the fish (1, 2), wherein said functional distance (35) is adapted to include sections of lowering (36) of the engagement means (34) in a direction towards the fish (1, 2) lying in a trough (3) of said apparatus, displacing (37) the fish (1, 2) within the trough (3); and cutting off the head and lifting (40) the engagement means (34) out of its engagement with the fish (1, 2).

16. Apparatus according to claim 15, characterised in that the engagement means is provided with at least one pointed object (34) which can be introduced into the fish (1, 2) and which in the region of the head (13) is provided with a mechanism which brings it into form-locking engagement with the fish (1, 2).

17. Apparatus according to claim 15, characterised in that the pointed object (34) is provided with two guides, of which a first one extends in the direction of advance maintained by the fish (1, 2) transversely to the longitudinal extent (5) of the fish (1, 2), and a second one extends transversely thereto in the direction of a longitudinal extent (5) of the fish (1, 2) lying in a conveying device.

18. Apparatus according to claim 17, characterised in that the pointed object (34) along its first guide is given the same speed of advance as the fish (1, 2) being conveyed transversely to its longitudinal extent (5).

19. Apparatus according to claim 17, characterised in that the first guide is constructed as an arc which in the region of the head (13) has reached a bottom position (31) adjacent to the head (13), in which it extends in form-locking relationship into the flesh layer (14) covering the head (13).

20. Apparatus according to claim 15, characterised in that it comprises a carousel (20) for guiding the engagement means (34).

21. Apparatus according to claim 20, characterised in that the carousel (20) consists of a circle curve (30) on which a first suspension of the engagement means (34) is guided, and there is provided a second suspension of the engagement means (34). Which is guided relative to the first suspension in such a way that the engagement means (34) is guided over a given distance in its position holding the head (13).

22. Apparatus according to claim 21, characterised in that the given distance roughly corresponds to a width of three troughs (3) forming part of the apparatus for conveying one fish (1, 2) each transversely to its longitudinal extent (5).

23. Apparatus according to claim 21, characterised in that on the circle curve (30) is superimposed an oval channel curve (27) in which a second suspension of the engagement means (34) is guided in such a way that the latter in the region of a function distance (35) is oriented vertically and perpendicularly to a trough (3).

24. Apparatus according to claim 23, characterised in that the displacement section (37) extends up to a position at which the side fins (16, 17) are caught in a catching device (43, 44).

25. Apparatus according to claim 24, characterised in that the catching device (43, 44) consists of mouldings (45, 46) which on both sides of the lateral surfaces (15) of the fish are oriented in a direction towards the fish (1, 2) lying exposed in the trough (3) in such a way that the side fins (16, 17) of the fish (1, 2) during displacement thereof are caught in them, so that the fish (1, 2) lies with a predetermined location (38) in the region of the cutting plane (39) of the blade (11).

26. Apparatus according to claim 25, characterised in that the catching device (43, 44) has an upper portion (42) which is arranged above the fish (1, 2) lying in the trough (3) and which is mounted so as to be vertically yielding to compensate for differences in height of the fish (1, 2) lying in the trough.

27. Apparatus according to claim 25, characterised in that the catching device (43, 44) is divided into at least two sections which are arranged successively in the conveying direction of a trough (3) for catching the fish (1, 2) which after conveying of the fish (1, 2) by a trough width has not yet reached its desired position for separation of the head (13).

28. Apparatus according to claim 15, characterised in that the at lest one spring element (54, 61) of the motion means moves the engagement means (34) in the direction of the longitudinal extent (5) of the fish (1, 2).

29. Apparatus according to claim 28, characterised in that the spring elements (54, 61) are coupled to at least one pivot lever (51, 52) one end of which spring elements is mounted in a pivotal manner on the positioning device (4), the other end (58, 59) of each of the spring elements being coupled to the engagement means (34).

30. Apparatus according to claim 29, characterised in that the engagement means (34) is biased by a compression spring (55) which forces it in a direction towards the fish (1, 2).

31. Apparatus according to claim 29, characterised in that the pivot levers (51, 52) are mounted pivotably in a plane in which the fish extends longitudinally in the trough (3).

32. Apparatus according to claim 28, characterised in that a curve (60) which can be released by the engagement means (34) when gripping the fish (1, 2) is provided for tensioning and releasing the spring elements (54, 61).

33. Apparatus according to claim 28, characterised in that two spring elements (54, 61) are provided, one of which is a stronger spring adapted for large fish and the other one being a smaller spring for the displacement of smaller fish (1, 2).

34. Apparatus according to claim 28, characterised in that the motion means are designed to be locked by a ratchet system (62) in its end position holding the fish (1, 2) in it cutting position.

35. Apparatus according to claim 15, characterised in that the fish (1, 2) during separation of its head (13) from the torso (12) is biased by the spring element (54, 61) via the engagement means (34).

36. Apparatus according to claim 15, characterised in that means are provided to maintain form locking can be maintained between the pointed object (34) and the fish (1, 2) on separation of the head (13) from the torso (12).

* * * * *